(12) United States Patent
Karlsen et al.

(10) Patent No.: US 11,498,155 B2
(45) Date of Patent: Nov. 15, 2022

(54) SCANNER DRIFT COMPENSATION FOR LASER MATERIAL PROCESSING

(71) Applicant: nLIGHT, Inc., Vancouver, WA (US)

(72) Inventors: Scott R. Karlsen, Battle Ground, WA (US); Robert J. Martinsen, West Linn, OR (US)

(73) Assignee: nLIGHT, Inc., Camas, WA (US)

( * ) Notice: Subject to any disclaimer, the term of this patent is extended or adjusted under 35 U.S.C. 154(b) by 484 days.

(21) Appl. No.: 16/745,242

(22) Filed: Jan. 16, 2020

(65) Prior Publication Data

US 2020/0147719 A1    May 14, 2020

Related U.S. Application Data

(62) Division of application No. 14/450,162, filed on Aug. 1, 2014, now Pat. No. 10,569,357.

(51) Int. Cl.
*B23K 26/03*    (2006.01)

(52) U.S. Cl.
CPC .................... *B23K 26/03* (2013.01)

(58) Field of Classification Search
CPC .............................. B23K 26/03; B23K 26/032
USPC ..................................... 219/121.83
See application file for complete search history.

(56) References Cited

U.S. PATENT DOCUMENTS

| | | | |
|---|---|---|---|
| 4,176,925 A | 12/1979 | Kocher et al. | |
| 4,815,067 A | 3/1989 | Webster et al. | |
| 5,214,528 A | 5/1993 | Akanabe et al. | |
| 5,400,132 A * | 3/1995 | Trepagnier | G01B 21/042 700/62 |
| 5,877,494 A | 3/1999 | Larsen et al. | |
| 6,347,171 B1 | 2/2002 | Tatah et al. | |
| 6,552,301 B2 | 4/2003 | Herman et al. | |
| 6,686,586 B2 | 2/2004 | Check | |
| 6,720,519 B2 | 4/2004 | Liu et al. | |
| 7,227,115 B2 | 6/2007 | Check | |
| 7,321,114 B2 | 1/2008 | Lizotte et al. | |
| 7,366,378 B2 | 4/2008 | Jia et al. | |
| 7,397,596 B2 | 7/2008 | Yacoubian | |
| 7,534,994 B2 | 5/2009 | Check | |
| 7,666,759 B2 | 2/2010 | Couch et al. | |

(Continued)

OTHER PUBLICATIONS

Bass et al., "Chapter 30: Scanners," *Handbook of Optics* 1(3):30-35 (2010).

(Continued)

*Primary Examiner* — Dana Ross
*Assistant Examiner* — Joseph W Iskra
(74) *Attorney, Agent, or Firm* — Klarquist Sparkman, LLP (57) ABSTRACT

A scanned optical beam is divided so as to form a set of scanned subbeams. To compensate for scan errors, a portion of at least one subbeam is detected and a scan error estimated based on the detected portion. A beam scanner is controlled according to the estimated error so as to adjust a propagation direction of some or all of the set of scanned subbeams. The scanned subbeams with adjusted propagation directions are received by an f-theta lens and directed to a work piece. In typical examples, the portion of the at least one subbeam that is detected is obtained from the set of scanned subbeams prior to incidence of the scanned subbeams to the f-theta lens.

20 Claims, 5 Drawing Sheets

(56) References Cited

U.S. PATENT DOCUMENTS

| | | | |
|---|---|---|---|
| 8,178,818 B2 * | 5/2012 | Baird | B23K 26/03 219/121.81 |
| 2003/0043441 A1 | 3/2003 | Azami et al. | |
| 2003/0140806 A1 | 7/2003 | Sandstrom | |
| 2006/0119692 A1 | 6/2006 | Yang et al. | |
| 2006/0205121 A1 | 9/2006 | Couch et al. | |
| 2007/0295921 A1 | 12/2007 | Check | |
| 2009/0242522 A1 | 10/2009 | Baird et al. | |
| 2011/0216302 A1 | 9/2011 | Luberek | |
| 2014/0063491 A1 | 3/2014 | Smith et al. | |

OTHER PUBLICATIONS

Eifel and Holtkamp, "Multi-beam technology boosts costs efficiency," Industrial Laser Solutions, 4 pages (Mar. 1, 2013), retrieved on Aug. 25, 2014 from http://www.industrial-lasers.com/articles/print/volume-28/issue-2/departments/update/multi-beam-technology-boosts-cost-efficiency.html.

Tsai and Kleinfeld, "In Vivo Two-Photon Laser Scanning Microscopy with Concurrent Plasma-Mediated Ablation Principles and Hardware Realization," in Methods for In Vivo Optical Imaging, Second Edition, R. Frostig, ed., 3:59-115 (2009).

* cited by examiner

SCANNER DRIFT COMPENSATION FOR LASER MATERIAL PROCESSING

CROSS REFERENCE TO RELATED APPLICATIONS

This application is a divisional of U.S. patent application Ser. No. 14/450,162, filed Aug. 1, 2014, which is hereby incorporated by reference in its entirety.

This application is related to U.S. patent application Ser. No. 13/915,509, filed Jun. 11, 2013, which is incorporated herein by reference.

FIELD

This disclosure pertains to laser beam control systems for material processing.

BACKGROUND

Laser based materials processing has been used in a variety of applications such as drilling, cutting, scribing, and trimming. In some applications, the ability for a processing beam to be split into several processing beams is particularly advantageous. For example, U.S. Pat. No. 8,178,818 to Baird et al. discloses a laser processing system that splits a pulsed laser beam into multiple beamlets that are delivered to a target. U.S. Pat. No. 7,666,759 to Couch et al. discloses another multi-beam processing system. For some laser material processing applications such as micromachining, the position of laser beam waists must be controlled to within less than 1 µm over long periods of time. This low drift requirement is tighter than that available with conventional beam deflectors or scanners, and improved methods and apparatus are needed.

SUMMARY

In some examples, exposure apparatus comprise a photodetector situated to receive a portion of at least one of a plurality of subbeams produced from a processing beam. A beam pointing controller is configured to establish a pointing error of at least one of the plurality of subbeams based on the portion of the at least one subbeam received by the photodetector. In some examples, a beam splitter such as a diffractive beam splitter is situated to produce the plurality of subbeams, and the plurality of subbeams is an array of subbeams. In a representative example, the array of subbeams is a two dimensional array. According to other examples, an aperture is situated so that a selected subbeam of the plurality of subbeams is received by the photodetector. In still other embodiments, a beam scanner is coupled to the beam pointing controller and configured to adjust a propagation direction of one, a few, or all subbeams of the plurality of subbeams based on the established pointing error. In a typical embodiment, the beam pointing scanner is a galvanometer scanner. In still further examples, a scanning system is situated to scan the processing beam so that the subbeams produced from a processing beam are scanned subbeams, and the portion of at least one of the plurality of subbeams received by the photodetector is a scanned portion.

In alternative examples, beam scanning systems comprise a processing beam scanner configured to produce a scanned processing beam. A first beam splitter is configured to produce a plurality of scanned subbeams from the scanned processing beam. A beam expander is configured receive the scanned subbeams and process the subbeams so as to have predetermined subbeam spacings. An optical scanner is situated to direct the scanned, spaced subbeams to a second beam splitter that produces working subbeam portions. A scanning lens is situated to receive the working portions of the scanned subbeams from the second beam splitter and direct the working portions to a work piece. A photodetector is situated to receive at least a portion of at least one of the scanned, spaced subbeams from the second beam splitter and produce an associated detector signal. A beam pointing controller is coupled to the photodetector and configured to produce an estimate of a subbeam displacement based on the detector signal. In some embodiments, at least one of the first and second beam expanders is a zoom beam expander having a zoom ratio selected based on a focal length of the scanning lens. According to some examples, the first beam splitter is a diffractive beam splitter, and the subbeams are associated with diffraction orders of the first beam splitter. In still further examples, at least one active mirror is situated so as to direct the scanned processing beam to the first beam splitter. In additional examples, the second beam splitter is situated to reflect the working portions of the scanned subbeams to the scanning lens and transmit the portion of at least one scanned subbeam from the second beam splitter to the photodetector. In additional representative examples, an aperture is situated to selectively transmit at least a portion of a selected subbeam to the photodetector so as to produce the associated detector signal, wherein the estimate of the subbeam displacement is associated with the selected subbeam.

Methods comprise selecting at least one subbeam from a set of scanned subbeams and detecting a portion of the selected subbeam. Based on the detected portion, a beam displacement associated with the selected subbeam is determined. In some examples, the scanned subbeams are produced by directing a scanned processing beam to a beam splitter. In other examples, a propagation direction of the selected subbeam is adjusted based on the determined beam displacement. In still other embodiments, the set of scanned subbeams is a two dimensional array of subbeams, and propagation directions of the array of subbeams is adjusted based on the determined beam displacement.

The foregoing and other features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

In some examples, optical elements are arranged along an axis. Typically, an axis corresponds to one or more line segments, and an axis can include bends and folds introduced by prisms, mirrors, or other reflective, refractive, or diffractive surfaces. As used herein, a beam or optical beam refers to electromagnetic radiation propagating along an axis. In typical examples in which beams are provided with lasers, beam angular divergence is generally less than about 0.5, 0.4, 0.3, 0.2, 0.1, or 0.05 and at a wavelength or in wavelength range between 100 nm and 20 μm. In the disclosed examples, refractive optical elements are used for beam forming, but combinations of reflective, refractive, diffractive, and other optical elements can be used. As used herein, optical beams or subbeams are referred to as displaced based on either lateral distances from an intended location or angular deviations from an intended propagation direction. Detector signals produced by photodetectors can be based on electrical currents, voltages, or combinations thereof, and detector signals can be directly associated with displacements or coupled to a processing system for displacement estimation. In the disclosed examples, beam splitters are situated to direct a reference portion of a plurality of subbeams to a detector for displacement estimation. While typical beam splitters direct portions of a plurality of subbeams as reference subbeams, in other examples, beam splitters are situated so as to direct portions of only a selected subbeam for displacement estimation. For example, such a beam splitter can include a partially transmissive or reflective area for the selected subbeam, and a substantially totally transmissive or reflective surface for the remaining subbeams.

Figure 1:
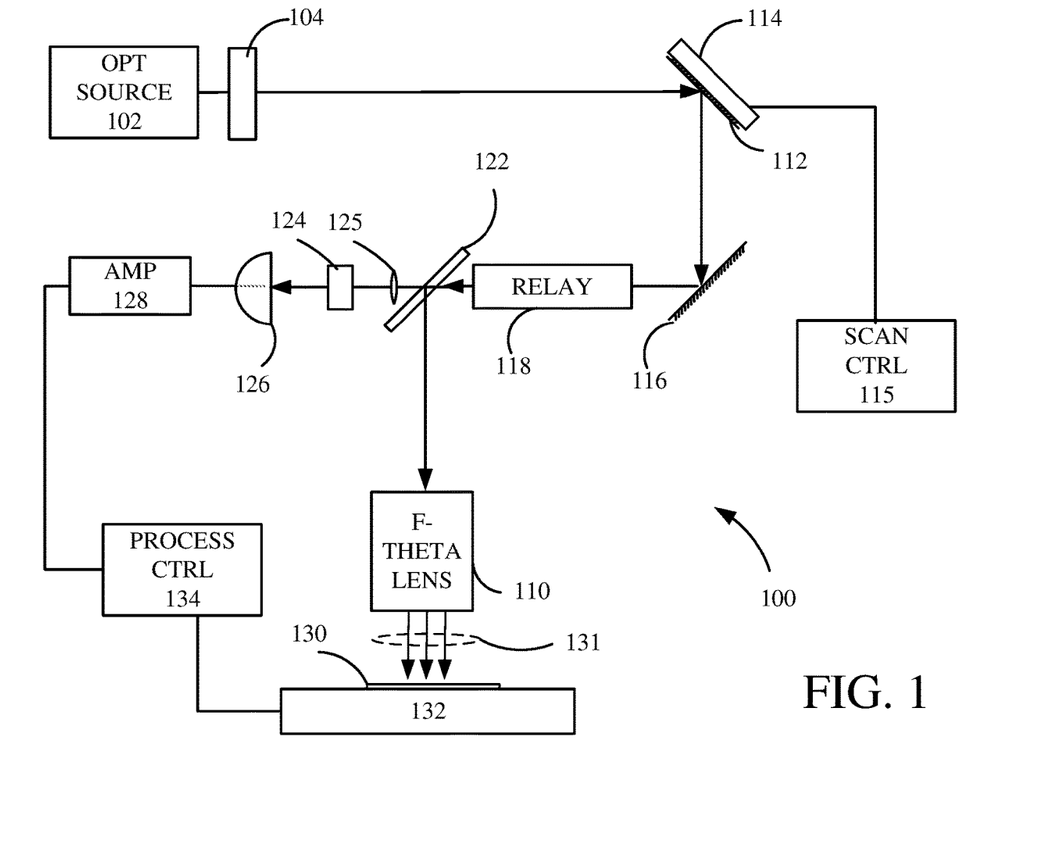
FIG. 1 is a schematic diagram of a laser-based processing system configured to deliver an array of subbeams to a work piece.

Referring to FIG. 1, a beam scanning system 100 includes an optical source 102, typically a fiber laser, diode laser, or other laser source. Optical radiation from the optical source 102 is received by a diffractive optical element 104. The diffractive optical element 104 is typically a diffractive beam splitter or array beam generator that produces an array of subbeams corresponding to diffraction orders of the diffractive optical element 104. In a typical example, a two dimensional array of equally spaced subbeams is produced with subbeams periodically situated along orthogonal axes and equally spaced along the orthogonal axes. In some examples, subbeams are produced that correspond to either even or odd diffractive orders with little optical power in the unselected (odd or even) orders. However, diffractive beam splitters can be selected to produce other subbeam arrays, such as one dimensional arrays, or two dimensional arrays with subbeams along non-orthogonal axes, and/or unevenly spaced subbeams along one or more axes. Beam splitting can also be provided with non-diffractive beam splitters.

The beam array is then directed to a reflector 112 that is secured to a galvanometer scanner 114, and is directed by the reflector 112 to a reflector 116 and to a relay optical system 118. The relay optical system is generally a 1:1 beam expander, and is configured to provide working distance to permit introduction of additional optical components before the subbeams reach an f-theta lens 110.

The galvanometer scanner 114 is coupled to a galvanometer controller 115 so that adjustment of the reflector 112 by rotation along one or more axes can scan or otherwise adjust a propagation direction of the subbeam array. Galvanometer scanners are convenient, but other scanners or optical elements that can vary a beam propagation direction can be used such as rotating mirrors, acousto-optic, and electro-optic beam scanners. A beam splitter 122 receives the scanned or adjusted subbeam array and couples a portion of the subbeam array via an aperture 124 and a lens 125 to a photodetector 126. The detector 126 is coupled to a photodetector amplifier 128 that provides an electrical signal associated with detection of a portion of the subbeam array received by the detector 126 to the galvanometer controller 115.

The detector 126 is generally configured to permit assessment of a pointing direction of one or more of the subbeams produced by the diffractive beam splitter 104. The arrangement of the subbeams produced by the diffractive beam splitter 104 is generally fixed by the amplitude and phase variations applied to the input beam by the diffractive beam splitter 104 but variations in beam pointing introduced by other components can be compensated or corrected with the scanner 114. The detector 126 can be an array detector configured to permit determination of subbeam locations for a plurality of subbeams, a quadrant detector for determining offset of a selected subbeam, or a position sensitive detector that can be configured to receive one or many of the subbeams.

The subbeams are directed by the beam splitter 122 to the f-theta lens 110 so that a suitably spaced array 131 of subbeams is incident to a work piece 130. For convenience, the representative subbeam propagation directions of the array 131 are shown as parallel, but the subbeams can propagate along angularly spaced axes. A process controller 134 is coupled to a substrate stage 132 configured to move the work piece 130 through the subbeam array 131, and/or the subbeams can be translated with respect to the work piece 130. Subbeam spacing at the work piece 130 is based on diffraction angles of the subbeams, other optical components, the relay system 118, and a focal length of the f-theta lens 110. Alignment of the fixed subbeam array can be adjusted with the galvanometer 114.

Figure 2:
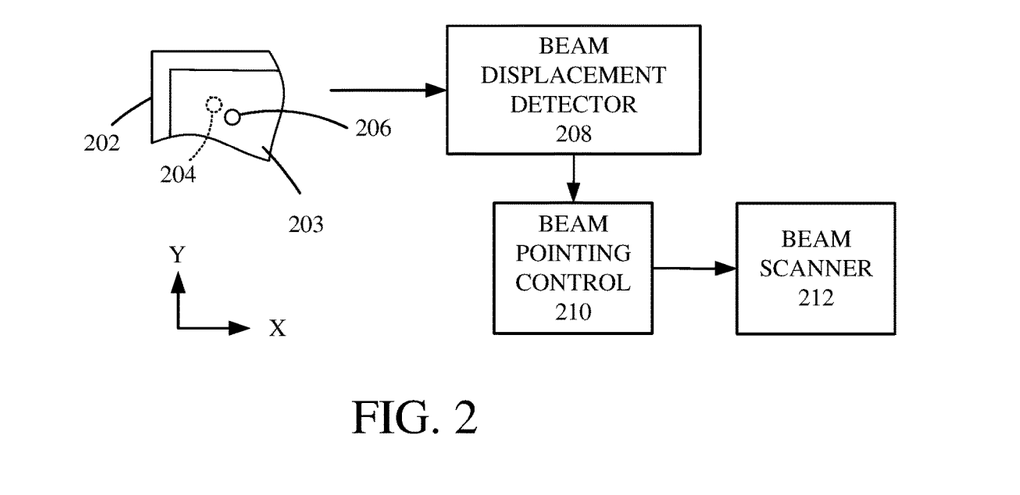
FIG. 2 illustrates a beam position control system that includes an array detector.

Pointing error detection and correction is illustrated in FIG. 2. An optical subbeam is incident to a photosensitive area 203 of a detector 202 at a corresponding subbeam incidence area such as area 204. As shown in FIG. 2, a preferred location of incidence of the subbeam is at a predetermined detector area 206, illustrating that the subbeam associated with area 204 has both X and Y-directed errors. The detector 202 is coupled to a beam displacement detector 208 that determines beam errors such as X and Y displacement errors based on an incidence area (such as the area 204) and corresponding predetermined detector area (such as the area 206). The beam displacement detector 208 is coupled to a beam pointing controller 210 that adjusts subbeam pointing direction (for one or all subbeams) with a beam scanner 212, such as a galvanometer or other beam deflector.

A beam pointing error $\theta$ is associated with a displacement of $f\theta$ at the array detector 202, wherein f is an effective focal length of an optical system situated to direct the subbeam array to the photodetector 202. For example, an X-directed displacement (error) $\Delta x$ corresponds to a pointing direction error of $\Delta x/f$. Pointing direction can be corrected upon detection of this error. Alternatively, the detected error can be within acceptable error tolerances so that no correction is applied, or the detected error can be so large as to be either uncorrectable or outside of a customary error range, and a visible, audible, or other indication of the error can be provided to an operator, or processing halted. If the effective focal length f used for error detection is substantially the same as a focal length $f_\theta$ of an f-theta lens used to direct subbeams to a work piece, detected X and Y-errors are substantially the same as errors at the work piece. For a pointing direction error $\Delta x/f$, the associated work piece error is $\Delta x f_\theta/f$. The effective focal length f can be selected to permit detection of a pointing error range in conjunction with detector characteristics such as size or detector element spacing (for an array detector).

Figure 3:
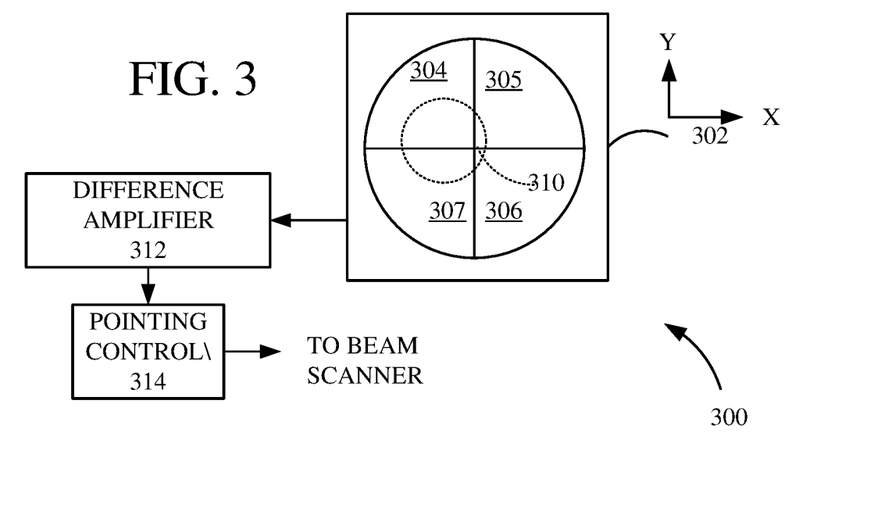
FIG. 3 illustrates a beam position control system that includes a quadrant detector.

Referring to FIG. 3, a quadrant photodetector 302 having photosensitive segments 304-307 is situated to receive a selected subbeam for determination of pointing error. As shown in FIG. 3, the selected subbeam is incident at an area 310, so that one or more difference signals associated with subbeam power received by the segments 304-307 can be provided by a difference amplifier 312. For example, respective photosignals (typically photocurrents) $I_{304}$, $I_{305}$, $I_{306}$, $I_{307}$ can be used to determine X-errors based on one or both difference signals $I_{304}-I_{305}$ and $I_{306}-I_{307}$. Based on determined pointing errors, a beam pointing controller supplies a suitable correction to a beam scanner. Y-errors can be determined based on one or more of the differences $I_{304}-I_{307}$ and $I_{305}-I_{306}$.

Figure 4:
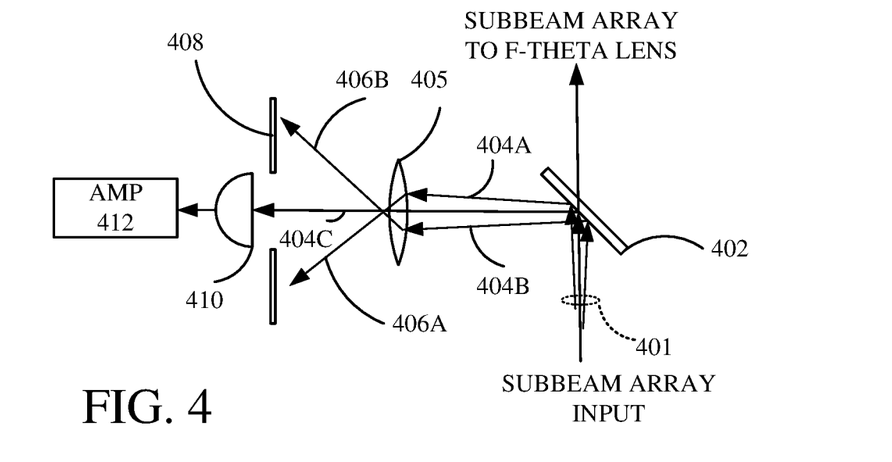
FIG. 4 illustrates an optical system configured to select a single subbeam from a plurality of subbeams and couple the selected subbeam to a position sensitive detector.

Selection of a single subbeam and detection of associated pointing error is illustrated in FIG. 4. A subbeam array 401 is directed to a beam splitter 402 that transmits (or reflects) subbeams to an f-theta lens or other beam forming optical system to be used in processing. Portions of the subbeams are reflected (or transmitted) by the beam splitter 402 to a lens 405. FIG. 4 illustrates subbeams propagating from the beam splitter 402 along axes 404A-404C. Subbeams propagating along the axes 404A, 404B are angularly deflected by the lens 405 so as to propagate along respective axes 406A, 406B so as to be blocked by an aperture plate 408. The angular deflections of the beams propagating along axes 404A-404B are typically proportional to a ratio of beam height at the lens 405 measured from a lens axis to the focal length of the lens 405. The subbeam propagating along axis 404C is shown as undeflected, but can be deflected as well. A detector 410 (such as an array detector, a quadrant detector, a position sensitive detector) is situated to receive the subbeam from the axis 404C and an amplifier 412 or other processing system determines a pointing error based on the received beam so that a suitable error signal can be delivering to a scanner for pointing error correction.

Figure 5A:
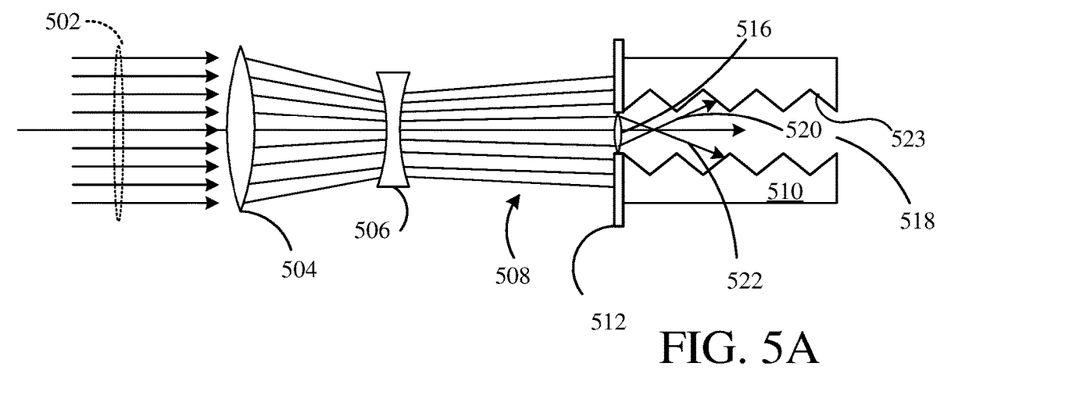
FIGS. 5A-5B illustrate representative embodiments of subbeam selection optical systems.

One implementation of a suitable optical system for delivering a subbeam to a detector for error determination is shown in FIG. 5A. A plurality 502 of subbeams is processed by a first lens 504 and a second lens 506 so that a diverging subbeam bundle 508 is incident to an aperture assembly 510. The first lens 504 is selected to converge the subbeams to the second lens 506 so that the combination of the first lens 504 and the second lens 506 increase divergence of the subbeams. The aperture assembly 510 includes a surface 512 that is arranged so as to be directed toward the incoming subbeams, and typically the surface 512 receives and blocks one or more of the subbeams. One or more subbeams, typically 2-10 subbeams are received by the aperture assembly 510 at a lens 516 and are coupled by the lens 516 into a first bore 518. The bore 518 can have a diameter such that in conjunction with the focal length of the lens 516, one or more subbeams propagating along axes 520, 522 are received at an interior wall 523. In typical examples, the axes 520, 522 correspond to diffraction orders associated with a diffractive beam splitter. One or more other subbeams propagating through the lens 516 and the bore 518 so as to be available for delivery to one or more detectors for use in pointing error determination and correction. The arrangement of FIG. 5A permits some subbeams to be attenuated before entry into the bore 518 as well as providing a substantial mass so that the aperture assembly 510 can accommodate high power subbeams. Interior surfaces of the bore 518 can be blackened, threaded, roughened or otherwise configured to scatter or absorb subbeams.

Figure 5B:
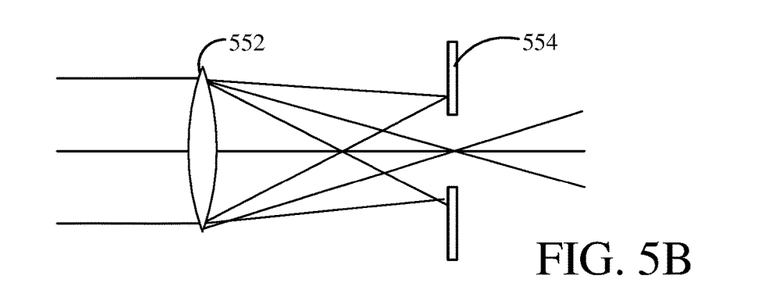

An alternative is illustrated in FIG. 5B. A lens 552 directs received subbeams to an aperture plate 554 such that one or more selected subbeams are transmitted. As shown in FIG. 5B, a single lens element is used and the lens focus is situated at the aperture 554. In some examples, multi-element lenses are used such as, for example, telephoto lenses that can provide a long focal length in a compact space.

Figure 6:
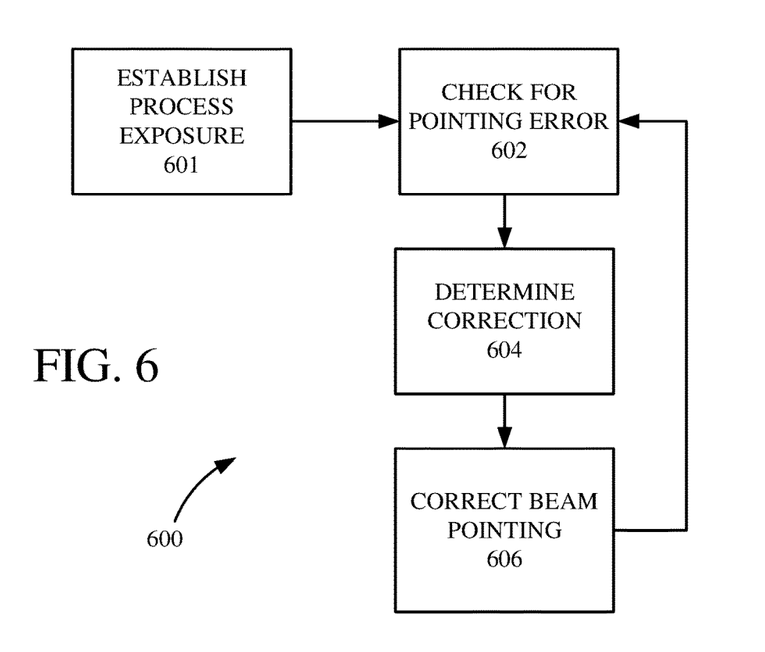
FIG. 6 is a block diagram of a representative method of controlling beam pointing direction.

A representative processing method with pointing error correction is illustrated in FIG. 6. At 601, processing conditions are established. For example, subbeam separations are produced, subbeams are directed to a work piece with suitable optical powers and separations, and exposure durations and scan rates selected. During processing (or prior to or between sequential work piece exposures), beam or subbeam pointing error is measured at 602. Based on the measured error, at 604 a suitable correction is determined, and at 606 beam pointing is corrected.

Figure 7A:
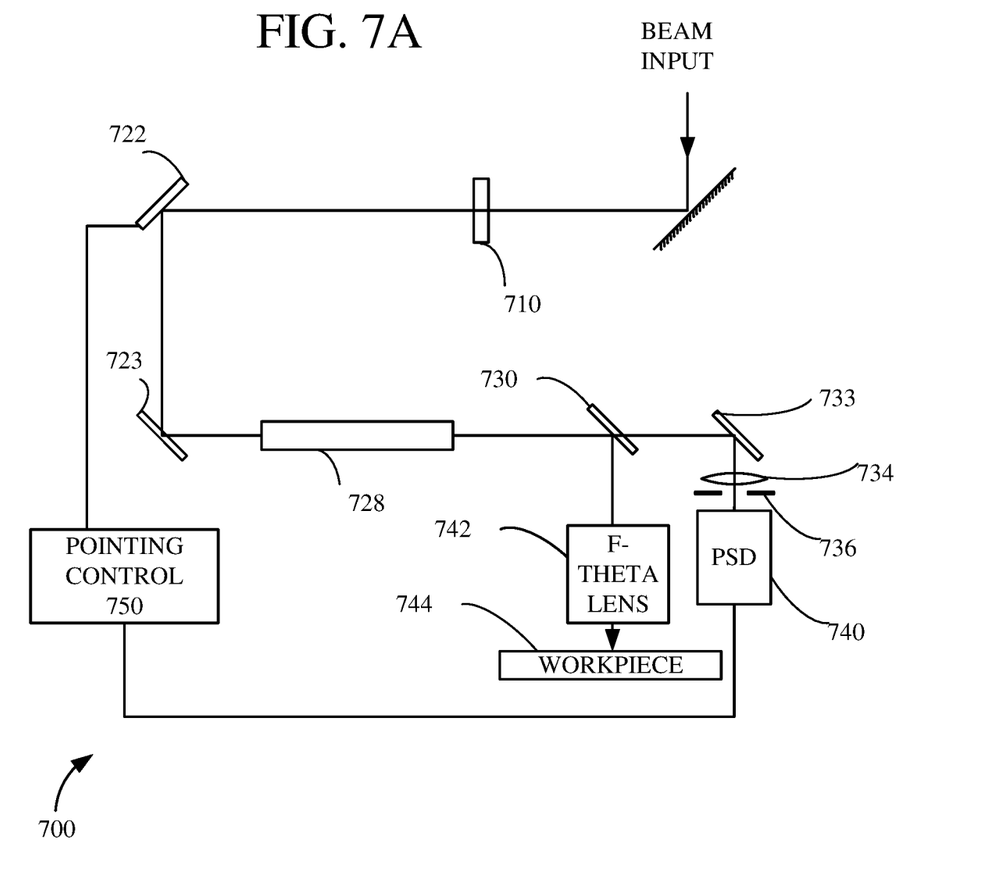
FIGS. 7A-7B illustrate alternative representative laser beam based processing systems that include a pointing error correction systems.

Referring to FIG. 7A, a laser exposure apparatus 700 delivers a beam to a diffractive beam splitter 710. A galvanometer scanned mirror 722 receives the subbeams from the diffractive beam splitter 710 and directs the subbeams to a reflector 723 and a beam expander 728. A beam splitter 730 reflects (in other configurations, transmits) the subbeams to an f-theta lens 742 for delivery to a work piece 744. Portions of the subbeams are coupled to a lens 734 from reflector 733, and so that the subbeams are directed to a position sensitive detector (PSD) 740 through an aperture 736 selected and positioned to block or attenuate subbeams that are not to be used in determining subbeam pointing error. A pointing controller 750 is coupled to the PSD 740 and is supplies a pointing error signal to the galvanometer scanned mirror 722.

Figure 7B:
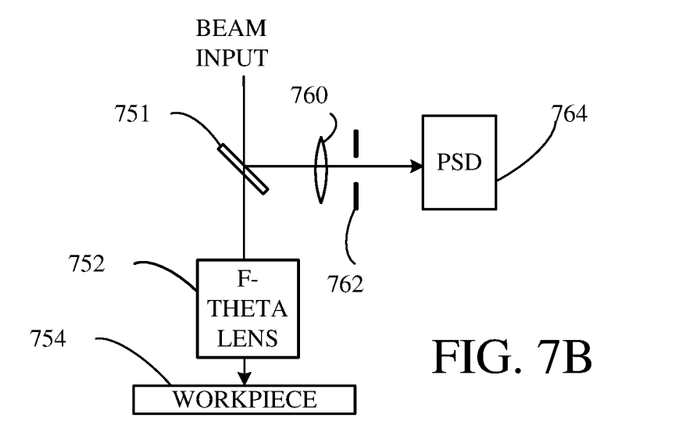

In another example illustrated in FIG. 7B, a beam is coupled to a beam splitter 751 so that a first beam portion is coupled to an f-theta lens 752 for processing a substrate 754. Another portion of the beam is coupled by the beam splitter 751 to a lens 760. An aperture 762 selectively transmits one or more subbeams to a position sensitive detector 764 so that an position error can be estimated.

Figure 8:
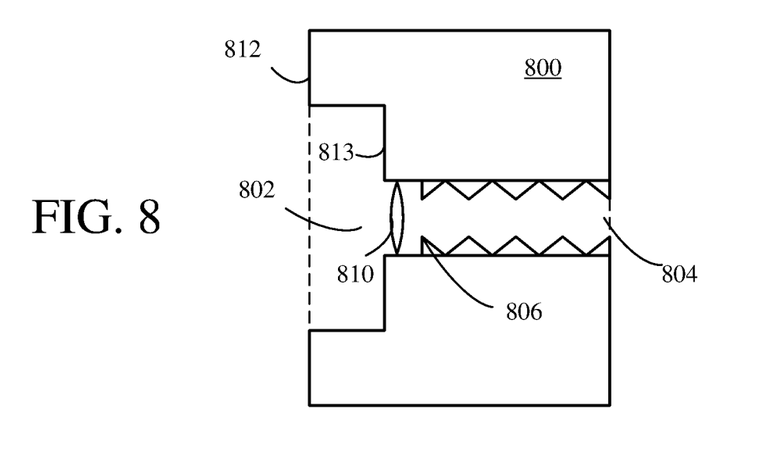
FIG. 8 illustrates an aperture assembly configured to attenuate one or more subbeams.

A representative aperture assembly 800 is shown in FIG. 8. The aperture assembly 800 includes a first bore 802 and second bore 804, and a lens 810 is situated proximate a junction of the first bore 802 and the second bore 804. An interior surface of the second bore 804 is provided with serrations 806. The assembly 800 is typically situated so that some subbeams are blocked by surfaces 812, 813 and the lens 810 directs other subbeams to the serrations 806. In this way, high power processing beams can be blocked and power dissipated.

Figure 9:
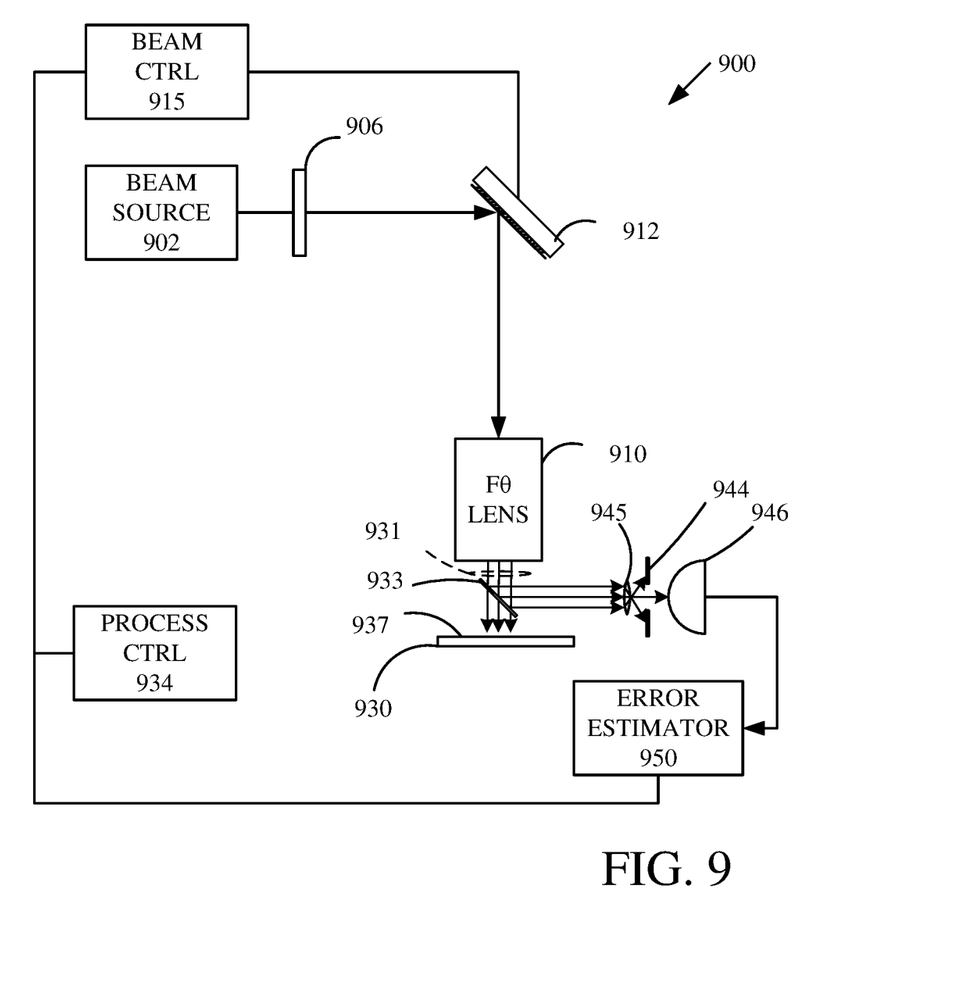
FIG. 9 illustrates a beam scanning system that produces scanned subbeams.

Referring to FIG. 9, a beam scanning system 900 includes a beam source 902 that provides an optical beam that is directed to a diffractive or other beam divider 906 along a predetermined axis. A plurality of subbeams are produced by the beam divider 906 and coupled to a scanner assembly 912 and directed to an f-theta lens 910. A plurality 931 of scanned subbeams is directed through a beam splitter 933 to a surface 937 of a work piece 930.

As shown in FIG. 9, portions of the subbeams are reflected by the beam splitter 933 to a lens 945 that converges the subbeams so that one or more subbeams are blocked by an aperture 944. A detector 946 receives a portion of one or more subbeams from the aperture. The detector 946 is typically a position sensing detector such as a quadrant detector or a position sensitive detector so that a detector signal coupled to an error estimator 950 can be used to assess subbeam pointing direction with respect to an intended pointing direction. A beam controller 915 is coupled to the error estimator 950 and directs the scanner assembly 912 to make a suitable correction.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A beam scanning system, comprising:
    a processing beam scanner configured to produce a scanned processing beam;
    a first beam splitter configured to produce a plurality of scanned subbeams from the scanned processing beam;
    an optical scanner situated to direct the scanned subbeams from the first beam splitter;
    a second beam splitter situated to receive the scanned subbeams from the optical scanner;
    a scanning lens situated to receive working portions of the scanned subbeams from the second beam splitter and direct the working portions to a work piece;
    a photodetector situated to receive at least a portion of at least one of the scanned subbeams from the second beam splitter and produce an associated detector signal; and
    a beam pointing controller coupled to the photodetector, the beam pointing controller configured to produce an estimate of a subbeam displacement based on the detector signal.

2. The beam scanning system of claim 1, wherein the first beam splitter is a diffractive beam splitter, and the subbeams are associated with diffraction orders of the first beam splitter.

3. The beam scanning system of claim 1, wherein the second beam splitter is situated to reflect the working portions of the scanned subbeams to the scanning lens and transmit the portion of the at least one of the scanned subbeams from the second beam splitter to the photodetector.

4. The beam scanning system of claim 1, further comprising an aperture situated to selectively transmit the portion of the at least one of the scanned subbeams from the second beam splitter to the photodetector to produce the detector signal, wherein the estimate of the subbeam displacement is associated with the at least one of the scanned subbeams.

5. The beam scanning system of claim 1, wherein the beam pointing controller is coupled to the optical scanner so as to direct the scanned subbeams based on the estimate of subbeam displacement.

6. The beam scanning system of claim 5, wherein the estimate of beam displacement is associated with displacements in at least two orthogonal directions.

7. The beam scanning system of claim 1, wherein the processing beam scanner is a galvanometer scanner.

8. The beam scanning system of claim 1, wherein the plurality of scanned subbeams produced by the first beam splitter forms a two-dimensional array.

9. The beam scanning system of claim 1, wherein the scanning lens is an f-theta lens.

10. The beam scanning system of claim 1, wherein the displacement error is associated with beam displacements in two orthogonal directions.

11. A method, comprising:
    producing a scanned processing beam;
    with a first beam splitter, producing a plurality of scanned subbeams from the scanned processing beam;
    with an optical scanner, directing the scanned subbeams from the first beam splitter to a second beam splitter;
    with a scanning lens, directing working portions of the scanned subbeams from the second beam splitter to a work piece;
    receiving at least a portion of a selected scanned subbeam from the second beam splitter at a photodetector and producing an associated detector signal; and
    producing an estimate of a subbeam displacement based on the detector signal.

12. The method of claim 11, wherein the first beam splitter is a diffractive beam splitter, and the subbeams are associated with diffraction orders of the first beam splitter.

13. The method of claim 11, wherein the second beam splitter reflects the working portions of the scanned subbeams to the scanning lens and transmits the portion of the selected scanned subbeam from the second beam splitter to the photodetector.

14. The method of claim 11, further comprising selectively transmitting a portion of the selected scanned subbeam from the second beam splitter to the photodetector to produce the detector signal, wherein the estimate of the subbeam displacement is associated with the selected subbeam.

15. The method of claim 11, wherein the working portions of the scanned subbeams are directed to the work piece based on the estimate of subbeam displacement.

16. The method of claim 15, wherein the estimated subbeam displacement is associated with displacements in at least two orthogonal directions.

17. The method of claim 11, further comprising producing the scanned beam with a galvanometer scanner.

18. The method of claim 11, wherein the plurality of scanned subbeams produced by the first beam splitter forms a two-dimensional array.

19. The method of claim 11, wherein the scanning lens is an f-theta lens.

20. The method of claim 11, wherein the estimated subbeam displacement is associated with displacements in at least two orthogonal directions.

* * * * *